US006223390B1

(12) United States Patent
LoTufo

(10) Patent No.: US 6,223,390 B1
(45) Date of Patent: May 1, 2001

(54) CARPET SAMPLE BOARD HANDLE

(76) Inventor: Robert J. LoTufo, 2710 Kanasita Dr., Hixson, TN (US) 37343

( * ) Notice: Subject to any disclaimer, the term of this patent is extended or adjusted under 35 U.S.C. 154(b) by 0 days.

(21) Appl. No.: 09/334,785

(22) Filed: Jun. 16, 1999

(51) Int. Cl.[7] .......... F16L 5/00
(52) U.S. Cl. .......... 16/110.1; 16/2.1; 24/713.6
(58) Field of Search .......... 16/110.1, 440, 16/443, 2.1; 248/609; 160/370.21, 382, 330, 368.1, DIG. 6; 24/713.6

(56) References Cited

U.S. PATENT DOCUMENTS

| | | | | |
|---|---|---|---|---|
| D. 245,944 | | 9/1977 | Benson | D87/1 R |
| D. 383,327 | | 9/1997 | Loflin | D6/410 |
| 3,372,441 | * | 3/1968 | Fisher | 16/2.1 |
| 3,965,583 | | 6/1976 | Price | 35/55 |
| 4,128,176 | | 12/1978 | Green | 211/45 |
| 4,234,088 | | 11/1980 | Berkowitz | 206/408 |
| 4,253,259 | | 3/1981 | Schaffer et al. | 40/492 |
| 4,397,061 | * | 8/1983 | Kanzaka | 16/2.1 |
| 4,427,118 | | 1/1984 | Corrigan et al. | 211/45 |
| 4,542,827 | | 9/1985 | Pilzer | 206/483 |
| 4,604,061 | | 8/1986 | Willcocks et al. | 434/74 |
| 4,843,675 | * | 7/1989 | Diamantis | 24/713.6 X |
| 5,031,268 | * | 7/1991 | McCabe | 16/2.1 |
| 5,104,147 | | 4/1992 | King | 281/21.1 |
| 5,636,869 | | 6/1997 | Holmes | 281/45 |
| 5,647,107 | * | 7/1997 | Brewster | 16/2.1 |
| 5,870,799 | * | 2/1999 | Benda | 16/2.1 |

* cited by examiner

*Primary Examiner*—Robert J. Sandy
(74) *Attorney, Agent, or Firm*—Miller & Martin LLP

(57) ABSTRACT

A handle for a carpet sample board is described comprising two grommets, each with an outer flange to cover the hole cut in the sample board, an arcuate section defining an ovular hand opening and thereby provide a comfortable grip while simultaneously preventing fraying of the hole in the board. The grommets are joined about the hole in the sample board by mating male and female plugs.

18 Claims, 4 Drawing Sheets

CARPET SAMPLE BOARD HANDLE

FIELD OF THE INVENTION

The present invention relates to a handle for carpet sample boards.

BACKGROUND OF THE INVENTION

In the carpet industry, it is necessary to show dealers and customers a wide variety of carpet samples due to the many different color, pattern, weight, yarn and tufting combinations that are available. One of the more popular methods of transporting and displaying carpet samples is by mounting the samples on a display board. These boards are typically eighteen inches wide and twenty-seven inches tall, made of one-fourth inch thick paper "chip board." The board is laminated with a glossy printed advertisement and carpet swatches are glued or otherwise affixed to it.

Typical display boards can weigh as much as, or even in excess of, ten pounds. Sample boards typically have an oval hole punched near their top center for use as a handle. This "handle hole" can have sharp edges, tends to fray, and in general has an unprofessional and unfinished look.

Other options for transporting and displaying carpet samples have generally included: placing carpet sample boards in binder systems so that multiple sample pages can be carried and displayed in a book-like format; or attaching elaborate handle systems to the sample boards.

The present invention adapts the standard sample chip board with handle hole at very little cost or additional weight to create a finished appearance, prevent fraying around the hole, and eliminate the sharp handle edges.

SUMMARY OF THE INVENTION

A handle for carpet sample boards is provided by the present invention which can be installed in new sample boards and used to retrofit existing boards. The handle is provided by two identical grommet halves which meet in the handle hole and secure the chip board between them. The grommet halves are joined by a simple mechanical interlocking mechanism such as a male and female plug system.

The grommet halves are elegantly and economically formed to provide a finished appearance to the sample boards, to provide a comfortable handhold with no sharp edges, and to prevent fraying of the edges of the handle.

DETAILED DESCRIPTION OF THE INVENTION

The preferred embodiment of the invention will be described in detail with reference to the drawings, wherein the referenced numerals represent like parts and assemblies throughout the views. Reference to the preferred embodiment does not limit the scope of the invention which is defined by the claims following.

Figure 8:
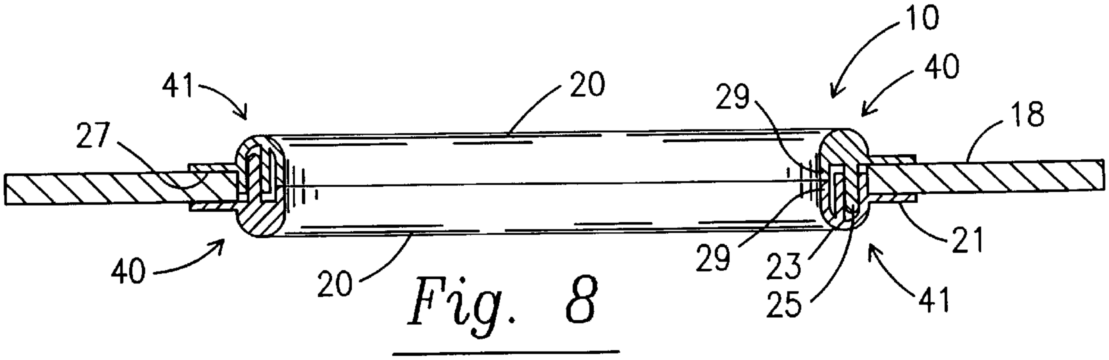
FIG. 8 is a cross sectional view of an assembled handle according to the present invention positioned through the hand hole of a sample board.
Figure 11:
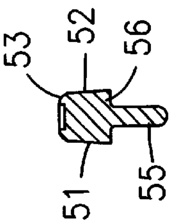
FIG. 11 is a sectional view of the spacer taken along line 11 shown in FIG. 10.
Figure 12:
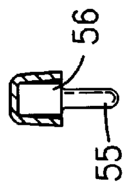
FIG. 12 is a cross sectional view of the spacer taken along line 12 shown in FIG. 10.
Figure 13:
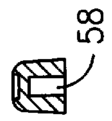
FIG. 13 is a cross sectional view of the spacer taken along line 13 shown in FIG. 10.
Figure 9:
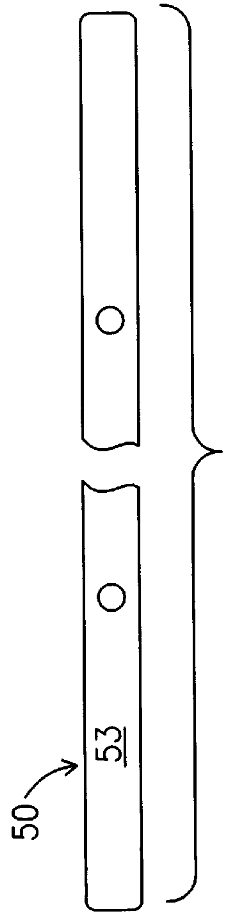
FIG. 9 is a top plan view of a spacer used on carpet sample boards in conjunction with the handle of the present invention.
Figure 10:
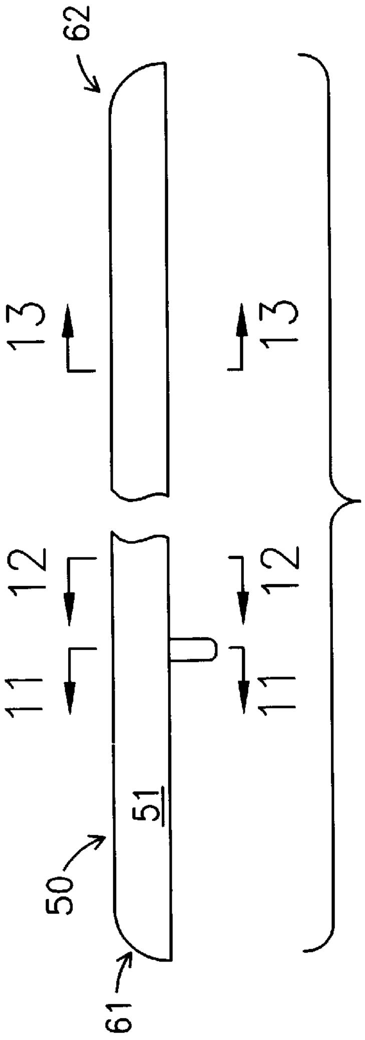
FIG. 10 is a front plan view of the spacer of FIG. 9.
Figure 14:
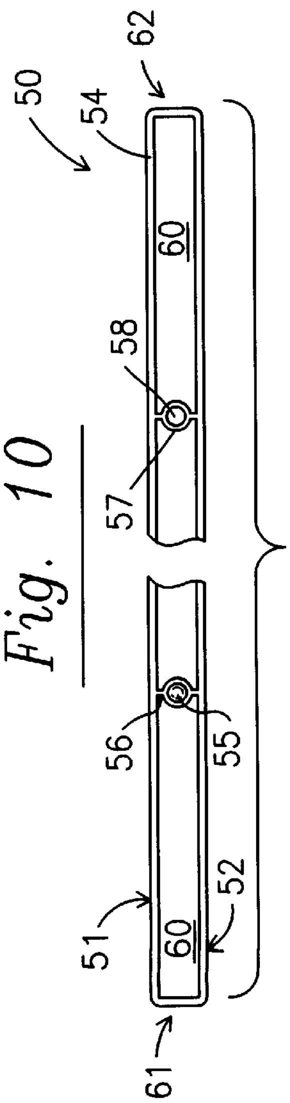
FIG. 14 is a bottom plan view of the spacer of FIG. 9.

Referring initially to FIG. 8, a cross sectional view of handle 10 is shown comprised of two identical grommets 20. FIGS. 1 through 6 show the grommets 20 in complete detail.

Figure 1:
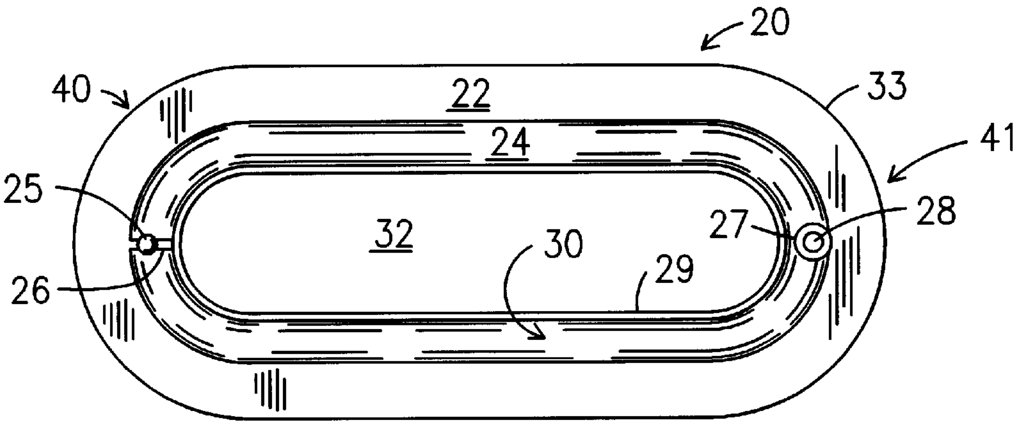
FIG. 1 is a bottom plan view of a grommet which comprises a part of the handle of the present invention

FIG. 1 is a bottom plan view of a grommet 20. It will be seen that grommet 20 is comprised of a flange with bottom surface 22 and perimeter 33. Interior of bottom flange surface 22 is a concave arcuate surface 24 which terminates in lip 29. Within the arcuate surface 24 and lip 29 is defined a hand opening 32. The grommet is preferably manufactured of injection melted plastic such as high impact polystyrene in a color that will not clash with the carpet sample boards. Black and white being the preferred colors. The typical thickness of the flange and arcuate portions is about 0.05 inches. The hand opening 32 is preferably almost one inch in height and almost four inches in length. The concavity of arcuate surface 24 generally results in defining channel 30 except for a male plug, such as post 25, at a first end 40 of the grommet 20 and a female plug, such as cylinder 27 defining opening 28, at an opposite second end 41 of grommet 20. In the illustrated construction, a solid wall 26 provides additional support to post 25.

Figure 2:
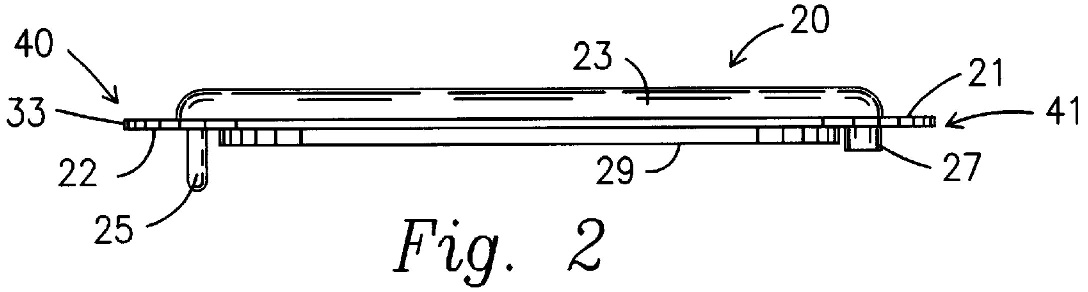
FIG. 2 is a front plan view of the grommet of FIG. 1.

FIG. 2 shows a side view of grommet 20 and more clearly depicts post 25 which extends for approximately 0.4 inches below the bottom surface 22 of the flange area. FIG. 2 also shows the top arcuate surface 23 which extends approximately 0.3 inches above the top surface 21 of the flange defined within perimeter 33. The interior lip 29 is shown extending about 0.15 inches beneath the bottom side 21 of the flange.

Figure 3:
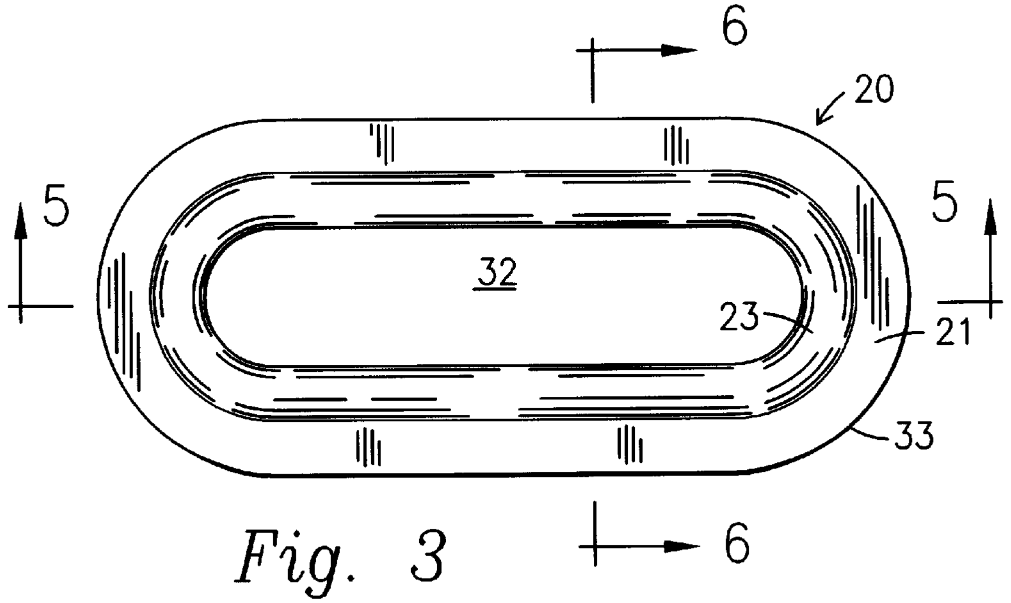
FIG. 3 is a top plan view of the grommet of FIG. 1.

FIG. 3 is a top view of grommet 20 showing the top flange surface 21 and the top arcuate surface 23 within which is defined the hand opening 32.

Figure 5:
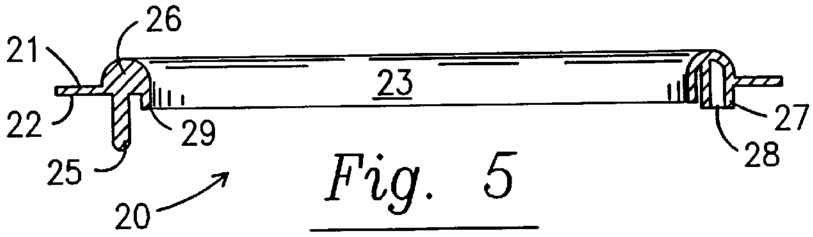
FIG. 5 is a cross sectional view of the grommet of FIG. 1 taken along line 5 shown in FIG. 3
Figure 4:
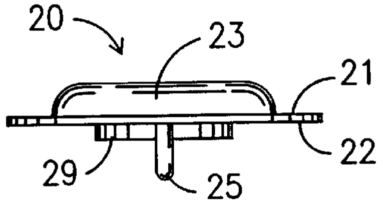
FIG. 4 is a left side plan view of the grommet of FIG. 1.
Figure 6:
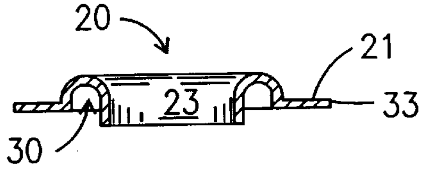
FIG. 6 is a cross sectional view of the grommet of FIG. 1 taken along line 6 shown in FIG. 3.

FIG. 4 provides a side view. FIG. 5 is a cross sectional view taken along line A shown in FIG. 3. Because this cross section intersects the support wall 26, channel 30 is not clearly visible. However, in FIG. 6, a sectional view taken along line B of FIG. 3 channel 30 can be clearly seen.

Figure 7:
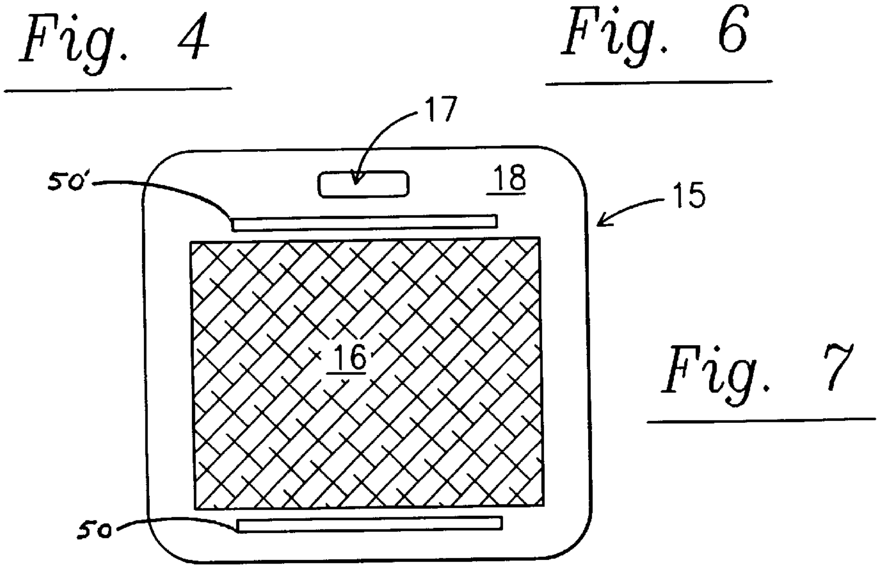
FIG. 7 is a top plan view of an alternative embodiment of a carpet sample board showing the use of top and bottom spacers.

FIG. 7 demostrates an alternative carpet sample board 15 composed of chip board 18, glued on carpet sample 16, and ungrommeted hand hole 17. Upper carpet spacer 50' and lower carpet spacer 50 are positioned above and below the carpet sample.

FIG. 8 shows the installation of a handle 10 according to the present invention comprised of grommet halves 20. It will be seen that the first end 40 containing a male plug such as post 25 of the bottom grommet 20 is positioned to interfit with the second end 41 containing a female plug such as hollow cylinder 27 of the top grommet. Both the lip portions 29 and the connecting post and cylinder structures 25, 27 are positioned within the hand hole 17 of chip board 18. The bottom flange surfaces 22 sandwich the chip board 18 and cover all of the hand hole 17 punched through the board. The result is a comfortable handgrip defined by outer arcuate surfaces 23 of the mated grommets 20. The result is to protect users' hands from sharp edges of the chip board 18, to prevent fraying of edges of the hand hole 17, and for the flange surfaces 21 to cover any irregularities in the hand hole 17.

FIGS. 9–14 disclose a spacer 50 that is advantageously used in connection with the handle 10 of the present invention. These spacers 50 are also advantageously injection molded of high impact polystyrene and are preferably somewhat shorter than the width of the carpet sample boards upon which they are to be used. A typical spacer 50 length would be about fifteen inches. Spacers 50 come in a variety of heights depending upon the carpet samples with which they are intended to be used. A typical spacer height is about one-half(½) inch, while a very thin carpet might suggest the use of a shorter spacer 50 and a deep carpet might suggest the use of a taller spacer 50. Spacers 50 have a top surface 53, a first side 51 and an opposed side 52. Spacers 50 also have a bottom surface 54 which advantageously defines a hollow channel 60. Within the channel 60 may be lateral supports to give spacer 50 structural stability. Preferably, one such support may be combined with a male plug such as post 55, the solid section 56 near the post 55 comprising the lateral support structure. A support may also be combined with hollow cylinder 57 forming a hole 58 which acts as a female plug. In the spacer 50 shown the male plug is located toward a first end 61 and the female plug is toward the second end 62.

Figure 15:
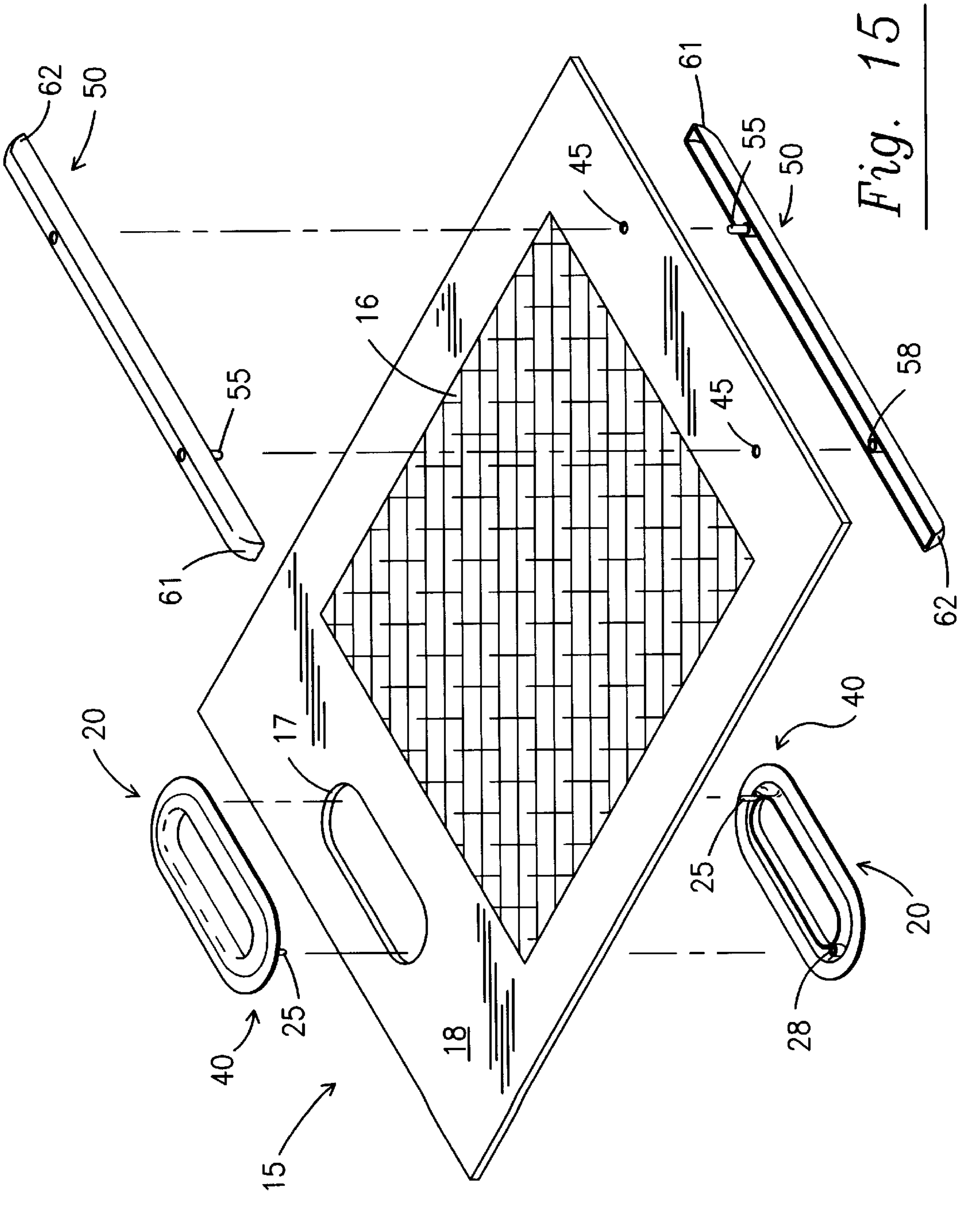
FIG. 15 is an exploded view of a carpet sample board utilizing the present handle invention and a spacer.

FIG. 15 shows an exploded view of a carpet sample board according to the present invention. A chip board 18 is shown with hand hole 17 and apertures 45 for spacers 50. A carpet sample 16 is affixed to face of chip board 18. A pair of grommets 20 are mated through hand hole 17 with the first ends 40 of the respective grommets 20 rotated 180 degrees from one another so that the male post 25 of the upper grommet 20 is received in the hole 28 of the lower grommet 20 through the hand hole 17. Similarly, the upper spacer 50 is oriented with its first end 61 and plug 55 opposite the second end 62 and hole 58 of the lower spacer 50. In this fashion the post 55 of each spacer 50 in received in the hole 58 of its paired spacer 50 and the two spacers are thereby joined about the chip board 18 to form an easily handled carpet sample board 15 with spacer 50 to protect carpet sample 16 from undue wear.

It will be obvious to those skilled in the art that various changes may be made without departing from the scope and spirit of the invention, and the invention is not to be considered limited to what is shown in the drawings and described in the specifications.

I claim:

1. A handle for a carpet sample board having a hand hole, a top side and a bottom side, comprising first and second grommets each having:

(a) an outer flange with a top surface and a bottom surface defined by an outer perimeter larger than the hand hole;

(b) an arcuate portion interior of the outer flange and defining a generally ovular opening of size less than the hand hole;

(c) a first end portion having a male plug on the bottom surface;

(d) an opposite second end portion having a female plug on the bottom surface; wherein said first grommet may be placed with its bottom flange surface on the top side of the sample board so that the ovular opening is alined with the hand hole and said second grommet may be placed with its bottom flange surface on the bottom side of the sample board so that the ovular opening is aligned with the hand hole and the female plug of its second end is mated with the male plug of the first end of the first grommet.

2. The handle according to claim 1 wherein the male plug of the first end of the second grommet is mated with the female plug of the second end of the first grommet.

3. The handle according to claim 1 wherein the bottoms of the arcuate portion of the first and second grommets are concave and form a channel.

4. The handle according to claim 1 wherein the male plugs of the first and second grommets comprise posts.

5. The handle of claim 1 wherein the interior of the arcuate portion of the first and second grommets comprises a lip extending beneath the bottom surface of the outer flange area.

6. The handle of claim 1 wherein the arcuate surface on the top sides of the first and second grommets extends to a height of about 0.3 inches above the outer flange portions.

7. A grommet having:

(a) an outer flange with a top surface and a bottom surface;

(b) an arcuate portion interior of the outer flange and defining a generally ovular opening;

(c) a first end portion having a male plug on the bottom flange surface;

(d) an opposite second end portion having a female plug on the bottom flange surface;

wherein the bottom flange surface of the arcuate portion is concave and forms a channel.

8. The grommet of claim 7 wherein the interior of the arcuate portion comprises a lip extending beneath the bottom surface of the outer flange.

9. The grommet of claim 7 wherein the male plug comprises a post.

10. The grommet of claim 7 wherein the female plug comprises a hollow cylinder.

11. A carpet sample board comprising:

(a) a board having a top surface and an opposite bottom surface, a hand hole passing between said top and bottom surfaces in an upper portion thereof and at least one spacer hole passing between said top and bottom surfaces in a lower portion thereof;

(b) a carpet sample of predetermined depth affixed to the top surface of the board between the hand hole and at least one spacer hole;

(c) a first grommet having an outer flange with a top surface and a bottom surface, an arcuate portion interior of the outer flange and defining a generally ovular opening, a first end portion having a male plug on the bottom flange surface and an opposite second end portion having a female plug on the bottom flange surface, positioned on the top surface of the board so that the bottom flange surface extends around the hand hole;

(d) a second grommet having an outer flange with a top surface and a bottom surface, a first end portion having a male plug on the bottom flange surface and an opposite second end portion having a female plug on the bottom flange surface, positioned on the bottom surface of the board so that the bottom flange surface extends around the hand hole and the female plug of the second end of the second grommet is mated with the male plug of the first end of the first grommet;

(e) a first spacer mounted on the top surface of the board having a bottom surface with a male plug extending into at least one spacer hole and having a top surface extending to a height above the board approximate to the predetermined depth of the carpet sample;

(f) a second spacer mounted on the bottom surface of the board, and having a female plug mated with the male plug of the first spacer.

12. The carpet sample board of claim 11 wherein the second grommet has an arcuate portion interior of the outer flange and the arcuate surface on the top sides of the first and second grommets extends to a height of about 0.3 inches above the outer flange portions.

13. The carpet sample board of claim 11 wherein the first and second grommets are of identical construction.

14. The carpet sample board of claim 11 wherein the first and second spacers are of identical construction.

15. The carpet sample board of claim 11 wherein the male plug of the first end of the second grommet is mated with the female plug of the second end of the first grommet.

16. The carpet sample board of claim, 11 wherein the second grommet has an arcuate portion interior of the outer flange and the bottom of the arcuate portion of the first and second grommets is concave and forms a channel.

17. The carpet sample board of claim 11 wherein the male plugs of the first and second grommets comprise posts.

18. The carpet sample board of claim 11 wherein the second grommet has an arcuate position interior of the outer flange and the interior of the arcuate portion of the first and second grommets comprises a lip extending beneath the bottom surface of the outer flange area.

* * * * *